United States Patent
Yamasaki et al.

(10) Patent No.: US 10,087,347 B2
(45) Date of Patent: Oct. 2, 2018

(54) PRESSURE-SENSITIVE ADHESIVE LAYER-BEARING POLARIZING FILM FOR TRANSPARENT CONDUCTIVE COATING, LAMINATE, AND IMAGE DISPLAY DEVICE

(71) Applicant: NITTO DENKO CORPORATION, Ibaraki-shi, Osaka (JP)

(72) Inventors: Mizue Yamasaki, Ibaraki (JP); Atsushi Yasui, Ibaraki (JP); Yuusuke Toyama, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/479,998

(22) Filed: Sep. 8, 2014

(65) Prior Publication Data

US 2015/0070603 A1 Mar. 12, 2015

(30) Foreign Application Priority Data

Sep. 9, 2013 (JP) .................................. 2013-186763

(51) Int. Cl.
| | | |
|---|---|---|
| G02F 1/1335 | (2006.01) | |
| C09J 133/08 | (2006.01) | |
| C09D 133/06 | (2006.01) | |
| C09D 139/06 | (2006.01) | |
| C08F 220/18 | (2006.01) | |

(52) U.S. Cl.
CPC ........... C09J 133/08 (2013.01); C08F 220/18 (2013.01); C09D 133/066 (2013.01); C09D 139/06 (2013.01); G02F 1/1335 (2013.01); C09J 2201/606 (2013.01); Y10T 428/1041 (2015.01); Y10T 428/1055 (2015.01); Y10T 428/1059 (2015.01); Y10T 428/264 (2015.01)

(58) Field of Classification Search
CPC .... G02B 5/30; G02F 1/1335; C09J 2203/318; Y10T 428/1036; Y10T 428/1041; Y10T 428/1055; Y10T 428/1059
USPC ................................................ 428/1.31, 1.54
See application file for complete search history.

(56) References Cited

U.S. PATENT DOCUMENTS

| | | | |
|---|---|---|---|
| 2006/0251844 A1* | 11/2006 | Choi et al. .................... 428/40.1 | |
| 2007/0002192 A1* | 1/2007 | Nishino et al. ................. 349/12 | |
| 2008/0118752 A1* | 5/2008 | Inoue et al. ................... 428/354 | |
| 2009/0033852 A1* | 2/2009 | Fukuda ............. G02F 1/133528 349/122 | |
| 2009/0122359 A1* | 5/2009 | Kondo et al. ................. 358/474 | |
| 2009/0163626 A1* | 6/2009 | Ukei ....................... B32B 27/06 524/99 | |
| 2009/0207347 A1* | 8/2009 | Shimizu et al. ................ 349/96 | |
| 2009/0324944 A1 | 12/2009 | Toyama et al. | |
| 2010/0002171 A1* | 1/2010 | Yoshimi .......................... 349/96 | |
| 2010/0039590 A1* | 2/2010 | Miyatake et al. ............... 349/96 | |
| 2010/0164896 A1* | 7/2010 | Nakayama et al. .......... 345/173 | |
| 2012/0055607 A1 | 3/2012 | Kitagawa et al. | |
| 2012/0055608 A1 | 3/2012 | Kitagawa et al. | |
| 2012/0055621 A1 | 3/2012 | Goto et al. | |
| 2012/0055622 A1 | 3/2012 | Kitagawa et al. | |
| 2012/0055623 A1 | 3/2012 | Kitagawa et al. | |
| 2012/0056211 A1 | 3/2012 | Kitagawa et al. | |
| 2012/0056340 A1 | 3/2012 | Kitagawa et al. | |
| 2012/0057104 A1 | 3/2012 | Kitagawa et al. | |
| 2012/0057231 A1 | 3/2012 | Goto et al. | |
| 2012/0058291 A1 | 3/2012 | Kitagawa et al. | |
| 2012/0058321 A1 | 3/2012 | Goto et al. | |
| 2013/0094083 A1* | 4/2013 | Ishii ....................... C09J 133/04 359/483.01 | |

FOREIGN PATENT DOCUMENTS

| | | | |
|---|---|---|---|
| JP | 09-281336 A | 10/1997 | |
| JP | 2004263084 A * | 9/2004 | |
| JP | 2006243132 A * | 9/2006 | |
| JP | 2008-292982 A | 12/2008 | |
| JP | 4691205 B1 | 6/2011 | |
| JP | WO 2012002178 A1 * | 1/2012 | ............ C09J 133/04 |
| JP | 2012-031390 A | 2/2012 | |
| JP | 5048120 B2 | 10/2012 | |
| JP | 2012-226354 A | 11/2012 | |

OTHER PUBLICATIONS

Office Action dated May 18, 2016, issued in counterpart Japanese Patent Application No. 2013-186763, with English translation. (8 pages).
Office Action dated Dec. 2, 2016, issued in counterpart Japanese Application No. 2013-186763, with English translation (8 pages).
Office Action dated Dec. 4, 2017, issued in Chinese Application No. 201410353013.7, with translation.
Office Action dated Jan. 12, 2018, issued in Taiwanese Patent Application No. 103131042, with translation.

* cited by examiner

Primary Examiner — Sophie Hon
(74) Attorney, Agent, or Firm — Westerman, Hattori, Daniels & Adrian, LLP

(57) ABSTRACT

A pressure-sensitive adhesive layer-bearing polarizing film for a transparent conductive coating, includes an iodine-based polarizing film and a pressure-sensitive adhesive layer placed on at least one side of the polarizing film, wherein the iodine-based polarizing film includes an iodine-based polarizer containing 1 to 14% by weight of iodine and/or iodide ions and having a thickness of 2 to 40 μm and a transparent protective film provided on at least one side of the polarizer and having a water-vapor permeability of 1,000 g/(m²·24 hours) or less at 60° C. and 90% R.H., and the pressure-sensitive adhesive layer has a saturated water content of 3.5% by weight or less at 60° C. and 90% R.H.

8 Claims, No Drawings

PRESSURE-SENSITIVE ADHESIVE LAYER-BEARING POLARIZING FILM FOR TRANSPARENT CONDUCTIVE COATING, LAMINATE, AND IMAGE DISPLAY DEVICE

BACKGROUND OF THE INVENTION

Field of the Invention

The invention relates to a pressure-sensitive adhesive layer-bearing polarizing film for a transparent conductive coating. The invention also relates to a laminate including a member having a transparent conductive coating and the pressure-sensitive adhesive layer-bearing polarizing film bonded to the member, and to an image display device including the laminate.

Description of the Related Art

Recently, transparent conductive coatings such as indium tin oxide (ITO) thin coatings are widely used in a variety of applications. For example, it is known that a transparent conductive coating is formed as an antistatic layer on one side of the transparent substrate of a liquid crystal cell opposite to its side in contact with its liquid crystal layer in a liquid crystal display device where the liquid crystal cell is of an in-plane switching (IPS) type or the like. A transparent conductive coating is also formed on a transparent resin film to form a transparent conductive film, which is used as an electrode substrate to form a touch panel. For example, input devices in which such a touch panel is used in combination with a liquid crystal display device or an image display device have become popular for use in mobile phones, mobile music players, and other devices.

Liquid crystal display devices or image display devices having such transparent conductive coatings are now strongly required to be lighter and thinner. Polarizing films for use in such liquid crystal display devices and so on are also required to be lighter and thinner, and a variety of methods for manufacturing thin polarizing films have been studied.

For example, a known method of manufacturing a thin polarizing film includes forming a thin polyvinyl alcohol (PVA) -based polymer layer on a resin substrate with a certain thickness and uniaxially stretching the resulting laminate to form a thin polarizing film on the resin substrate (see, for example, Patent Document 1). Another known method of manufacturing a thin polarizing film includes forming a PVA resin layer on one surface of a base film, subjecting the resulting laminate film to free-end longitudinal uniaxial stretching at a specific stretch ratio to obtain a stretched film, and dyeing the stretched film with a dichroic dye to form a thin polarizer (see, for example, Patent Document 2).

PRIOR ART DOCUMENTS

Patent Documents

Patent Document 1: Japanese Patent No. 4691205
Patent Document 2: Japanese Patent No. 5048120

SUMMARY OF THE INVENTION

When a transparent conductive coating is used as an antistatic layer, a pressure-sensitive adhesive layer-bearing polarizing film is placed on a liquid crystal cell having the antistatic layer, and the antistatic layer is bonded to the polarizing film with the pressure-sensitive adhesive layer interposed therebetween. When a transparent conductive coating is used as an electrode for a touch panel, the electrode-forming transparent conductive coating is bonded to a pressure-sensitive adhesive layer-bearing polarizing film in some cases.

Thin polarizing films obtained according to Patent Document 1 or 2 are all one-side protection polarizing films in which one side of the polarizer is protected by a transparent protective film. When such a polarizing film is bonded to a transparent conductive coating-bearing liquid crystal cell, the polarizer is bonded to the transparent conductive coating with a pressure-sensitive adhesive interposed therebetween. It has been found that when a transparent conductive coating is bonded to the polarizer surface of a one-side protection iodine-based polarizing film with a pressure-sensitive adhesive layer interposed therebetween, a small amount of iodine can leach from the iodine-based polarizer into the pressure-sensitive adhesive layer to reach and degrade (corrode) the transparent conductive coating. If the transparent conductive coating used as an antistatic layer is degraded, static electricity-induced unevenness can occur in a liquid crystal panel, and the antistatic performance can decrease. When a transparent conductive coating is used as an electrode for a touch panel, the degradation of the electrode can cause various problems such as an increase in electric resistance, a malfunction such as faulty sensing, and a reduction in touch panel sensitivity.

In addition to the techniques of reducing the thickness of a polarizer itself as disclosed in Patent Documents 1 and 2, techniques of making thinner polarizing films also include a technique of placing a transparent protective film on only one side of a polarizer and a technique of using a thinner transparent protective film. Even in a double-side protection polarizing film having a polarizer and transparent protective films provided on both sides of the polarizer, the phenomenon of the leaching of iodine from an iodine-based polarizer into a pressure-sensitive adhesive can occur to degrade a transparent conductive coating when a thinner transparent protective film is used as mentioned above. It has been found that this phenomenon is more likely to occur when a thinner transparent protective film with higher water-vapor permeability is used.

It is therefore an object of the invention to provide a pressure-sensitive adhesive layer-bearing polarizing film for a transparent conductive coating, the use of which makes it possible to suppress the degradation of the transparent conductive coating even when the pressure-sensitive adhesive layer is placed on the transparent conductive coating. It is another object of the invention to provide a laminate of such a pressure-sensitive adhesive layer-bearing polarizing film and a member having a transparent conductive coating, and to provide an image display device having such a laminate.

As a result of earnest study to solve the problems, the inventors have accomplished the invention based on findings that the objects can be achieved by controlling the water content of the pressure-sensitive adhesive layer and the water-vapor permeability of the transparent protective film.

Specifically, the invention relates to a pressure-sensitive adhesive layer-bearing polarizing film for a transparent conductive coating, comprising:

an iodine-based polarizing film; and a pressure-sensitive adhesive layer placed on at least one side of the iodine-based polarizing film;

wherein the iodine-based polarizing film comprises
an iodine-based polarizer
containing 1% to 14% by weight of iodine and/or iodide ions and
having a thickness of 2 to 40 μm, and
a transparent protective film
provided on at least one side of the polarizer and
having a water-vapor permeability of 1,000 g/(m²·24 hours) or less at 60° C. and 90% R.H.; and
the pressure-sensitive adhesive layer has a saturated water content of 3.5% by weight or less at 60° C. and 90% R.H. As used herein, the term an "iodine-based polarizer containing iodine and/or iodide ions" is intended to include an iodine-based polarizer containing iodine, an iodine-based polarizer containing iodide ions, and an iodine-based polarizer containing both iodine and iodide ions. In the invention, any of these polarizers can be advantageously used.

In the pressure-sensitive adhesive layer-bearing polarizing film of the invention, a value obtained by multiplying the iodine content (wt %) of the iodine-based polarizer by the thickness (μm) of the iodine-based polarizer is preferably from 10 wt %·μm to 80 wt %·μm.

In the pressure-sensitive adhesive layer-bearing polarizing film of the invention, the iodine-based polarizing film is preferably a one-side protection polarizing film, the transparent protective film being present on only one side of the iodine-containing polarizer; and
the pressure-sensitive adhesive layer may be in contact with a side of the one-side protection polarizing film on which the transparent protective film is not present.

In the pressure-sensitive adhesive layer-bearing polarizing film of the invention, the transparent conductive coating is preferably made of indium tin oxide, and the indium tin oxide is preferably amorphous indium tin oxide.

The invention also relates to a laminate, comprising:
a pressure-sensitive adhesive layer-bearing polarizing film; and
a transparent conductive member having a transparent conductive coating, wherein
the pressure-sensitive adhesive layer-bearing polarizing film is a pressure-sensitive adhesive layer-bearing polarizing film of the invention and
the transparent conductive coating of the member is in contact with and bonded to the pressure-sensitive adhesive layer of the polarizing film.

The invention also relates to an image display device including the laminate. In the image display device, the transparent conductive member having a transparent conductive coating may be a member including the transparent conductive coating and a liquid crystal cell or may be a transparent conductive film having the transparent conductive coating. The laminate may be used to form a touch panel.

It has been found that iodine-induced degradation of a transparent conductive coating becomes more likely to occur as the water content of the pressure-sensitive adhesive layer to be in contact with the transparent conductive coating increases. Thus, the invention controls factors related to the water content of the pressure-sensitive adhesive layer, such as the water content of the pressure-sensitive adhesive layer itself (derived from the composition) and the water-vapor permeability of the protective film, so that the invention makes it possible to suppress the degradation of the transparent conductive coating even when the transparent conductive coating is placed on the pressure-sensitive adhesive layer of the pressure-sensitive adhesive layer-bearing polarizing film.

DETAILED DESCRIPTION OF THE PREFERRED EMBODIMENTS

1. Pressure-sensitive Adhesive Layer-bearing Polarizing Film for Transparent Conductive Coating The pressure-sensitive adhesive layer-bearing polarizing film of the invention for a transparent conductive coating includes:
an iodine-based polarizing film; and
a pressure-sensitive adhesive layer placed on at least one side of the iodine-based polarizing film;
wherein the iodine-based polarizing film comprises
an iodine-based polarizer
containing 1% to 14% by weight of iodine and/or iodide ions and
having a thickness of 2 to 40 μm, and
a transparent protective film
provided on at least one side of the polarizer and
having a water-vapor permeability of 1,000 g/(m²·24 hours) or less at 60° C. and 90% R.H.; and
the pressure-sensitive adhesive layer has a saturated water content of 3.5% by weight or less at 60° C. and 90% R.H.

(1) Iodine-based Polarizing Film

The iodine-based polarizing film used in the invention includes an iodine-based polarizer containing 1 to 14% by weight of iodine and/or iodide ions and having a thickness of 2 to 40 μm; and a transparent protective film that is provided on at least one side of the polarizer and has a water-vapor permeability of 600 g/(m²·24 hours) or less at 60° C. and 90% R.H. In the invention, the iodine-based polarizing film may be a one-side protection polarizing film including an iodine-based polarizer and a transparent protective film provided on one side of the polarizer or a double-side protection polarizing film including an iodine-based polarizer and transparent protective films provided on both sides of the polarizer. The advantageous effect of the invention is more remarkable when the one-side protection polarizing film is used. Even in the case of the double-side protection polarizing film, the advantageous effect of the invention is also more remarkable when the transparent protective film on the pressure-sensitive adhesive layer side is relatively thin (e.g., 25 μm or less in thickness). When the polarizing film is a one-side protection polarizing film, the pressure-sensitive adhesive layer may be provided directly on the surface the one-side protection polarizing film on which the transparent protective film is not present.

In the invention, the content of iodine and/or iodide ions in the iodine-based polarizer (hereinafter also referred to as the "iodine content") is from 1 to 14% by weight and may be from 2 to 12% by weight or from 4 to 11% by weight. If the iodine content is less than 1% by weight, the polarizer will have insufficient polarization properties, although the amount of iodine moving from the iodine-based polarizer to the transparent conductive coating will be small so that the transparent conductive coating will not be degraded. An iodine content of more than 14% by weight can cause significant degradation of the transparent conductive coating, static electricity-induced unevenness, and degradation of shield performance. When the iodine-based polarizer is the thin polarizer described below, the iodine content is preferably from 4 to 12% by weight, more preferably from 4 to 11% by weight.

When the pressure-sensitive adhesive layer-bearing polarizing film of the invention is used, a transparent conductive coating can be placed on the pressure-sensitive adhesive layer of the polarizing film of the invention. In the resulting laminate, iodine-induced degradation of the transparent conductive coating is prevented even when the iodine-based polarizer has a high iodine content. Therefore, when the polarizing film is incorporated in a liquid crystal panel, static electricity-induced unevenness will not occur, and shield performance can be effectively provided. The degradation of the transparent conductive coating occurs when iodine from the iodine-based polarizer reaches the transparent conductive coating through the pressure-sensitive adhesive layer. It has been found that the iodine-induced degradation becomes more likely to occur as the water content of the pressure-sensitive adhesive layer increases. As described below, the invention makes it possible to suppress the iodine-induced degradation of the transparent conductive coating by reducing the level of factors related to the water content of the pressure-sensitive adhesive layer, such as the water content of the pressure-sensitive adhesive itself (the content of water derived from the composition) and the water-vapor permeability of the protective film.

The iodine-based polarizer has a thickness of 2 to 40 µm, preferably 2 to 25 µm, more preferably 3 to 10 µm. If the iodine-based polarizer has a thickness of more than 40 µm, the iodine-based polarizer will contain a relatively large amount of iodine accordingly, which can increase the degradation of the transparent conductive coating. A thin iodine-based polarizer with a thickness of 10 µm or less is also preferred because it is less uneven in thickness, can provide good visibility, and is less dimensionally-changeable so that it can have high durability and form a thinner polarizing film.

The iodine-based polarizer to be used may be any type of polarizer containing 1 to 14% by weight of iodine and/or iodide ions and having a thickness of 2 to 40 µm. Such a polarizer may be, for example, a product produced by a process including adsorbing iodine to a hydrophilic polymer film such as a polyvinyl alcohol (PVA)-based film, a partially-formalized PVA-based film, or a partially-saponified, ethylene-vinyl acetate copolymer-based film and uniaxially stretching the film. In particular, a polarizer including a PVA-based film and iodine is preferred.

A polarizer that is uniaxially stretched after a PVA-based film dyed with iodine is obtained by stretching a PVA film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the PVA-based film may be dipped in water and rinsed if needed. By rinsing PVA-based film with water, effect of preventing un-uniformity, such as unevenness of dyeing, is expected by making PVA-based film swelled in addition that also soils and blocking inhibitors on the PVA-based film surface may be washed off. Stretching may be applied after dyed with iodine or may be applied concurrently, or conversely dyeing with iodine may be applied after stretching. Stretching is applicable in aqueous solutions, such as boric acid and/or potassium iodide, and in water bath.

Typical examples of the thin type polarizer having a thickness of 10 µm or less include thin type polarizing films described in publications of JP-A-51-069644 and JP-A-2000-338329, the pamphlet of WO2010/100917, the specification of Japanese Patent No. 4751481, and the publication of JP-A-2012-073563. These thin type polarizing films can be obtained by a producing method including the step of stretching a PVA based resin layer and a resin substrate for stretching in the state that these are laminated on each other, and the step of dyeing the resultant laminate. According to this producing method, the PVA based resin layer can be stretched without causing inconveniences by the stretching, such as breaking, even when the PVA based resin layer is thin, because the PVA based resin layer is supported by the resin substrate for stretching.

Among thin type polarizing films as described above, which are obtained by the method including the step of stretching in the state of a laminate and the step of dyeing the laminate, preferred is one obtained by a method including a step of stretching such a laminate in an aqueous boric acid solution, as described in the pamphlet of WO 2010/100917, or the specification of Japanese Patent No. 4751481 or the publication of JP-A-2012-073563, since the laminate can be stretched into a high stretching ratio and improved in polarizing performance. Particularly preferred is a polarizing film obtained by the method described in the specification of Japanese Patent No. 4751481 or the publication of JP-A-2012-073563, which includes the step of stretching such a laminate subsidiarily in the air before the laminate is stretched in an aqueous boric acid solution.

The value obtained by multiplying the iodine content of the iodine-based polarizer by its thickness is preferably from 10 to 80 wt %·µm, more preferably from 15 to 70 wt %·µm, even more preferably from 18 to 50 wt %·µm. If the value is less than 10 wt %·µm, the polarizer may have insufficient polarization properties, although the amount of iodine moving from the iodine-based polarizer to the transparent conductive coating will be small so that the transparent conductive coating will not be degraded. If the value exceeds 80 wt %·µm, the degradation of the transparent conductive coating may tend to increase. As used herein, the term "wt %" stands for "% by weight".

The transparent protective film provided on one or each side of the iodine-based polarizer has a water-vapor permeability at 60° C. and 90% R.H. of 1,000 g/(m²·24 hours) or less, preferably 700 g/(m²·24 hours) or less, more preferably 500 g/(m²·24 hours) or less, even more preferably 300 g/(m²·24 hours) or less, further more preferably 150 g/(m²·24 hours) or less. If the water-vapor permeability of the transparent protective film exceeds the above range, a larger amount of water can enter through the transparent protective film to increase the water content of the pressure-sensitive adhesive layer, so that iodine-induced degradation of the transparent conductive coating can easily occur when the pressure-sensitive adhesive type optical film having the pressure-sensitive adhesive layer is bonded to the transparent conductive coating. Such a polarizing film is also not preferred because when incorporated in a transparent conductive coating-containing liquid crystal panel, it can cause static electricity-induced unevenness or degradation of shield performance. The lower the water-vapor permeability of the transparent protective, the more effective it will be. Thus, there is no particular lower limit to the water-vapor permeability. The water-vapor permeability of the transparent protective film can be measured by the method described in the section titled "Examples".

The material of the transparent protective film provided over one or both surfaces of the iodine-based polarizer is preferably a material excellent in transparency, mechanical strength, thermal stability, water blocking performance, isotropy, and others. Examples thereof include polyester based polymers such as polyethylene terephthalate and polyethylene naphthalate; cellulose based polymers such as diacetylcellulose and triacetylcellulose; acryl-based polymers such as polymethyl methacrylate; styrene based polymers such as polystyrene and acrylonitrile/styrene copolymer (AS resin); and polycarbonate based polymers. Other examples thereof include polyolefin based polymers such as polyethylene, polypropylene, any polyolefin having a cyclic structure or a norbornene structure, and ethylene/propylene copolymer; vinyl chloride based polymers; amide based polymers such as nylon and aromatic polyamide; imide based polymers; sulfone based polymers; polyethersulfone based polymers; polyetheretherketone based polymers; polyphenylenesulfide based polymers; vinyl alcohol based polymers; vinylidene chloride based polymers; vinyl butyral based polymers; acryl-based polymers; polyoxymethylene based polymers; epoxy based polymers; and any blend of two or more of these polymers. The transparent protective film may also be in the form of a cured layer of thermosetting resin or ultraviolet-curable resin such as acrylic, urethane, acrylic urethane, epoxy and silicone resin.

In general, a thickness of the transparent protective film, which can be determined arbitrarily, is preferably about 1 to 500 μm, more preferably about 1 to 300 μm, even more preferably 5 to 200 μm, still more preferably about 10 to 80 μm, in viewpoint of strength, work handling and thin layer.

The water-vapor permeability of the transparent protective film is influenced not only by the material of the transparent protective film but also by its thickness. Therefore, the water-vapor permeability of the transparent protective film is determined taking into account the balance between the material and the thickness. The water-vapor permeability of the transparent protective film increases with decreasing thickness or decreases with increasing thickness. A coating of a low water-vapor permeability material may also be formed on the surface of the transparent protective film to control the water-vapor permeability. For example, a transparent protective film with a desired water-vapor permeability can be obtained by applying an acrylic coating material with a low water-vapor permeability to the transparent protective film. When a low water-vapor permeability material coating is formed, the thickness of the coating is typically, but not limited to, about 5 to about 30 μm.

The polarizer and the transparent protective film are bonded with an aqueous adhesive. The aqueous adhesive includes isocyanate based adhesives, polyvinyl alcohol based adhesives, gelatin based adhesives, vinyl based latex based adhesives, aqueous polyurethane based adhesives, aqueous polyester based adhesives, and the likes. Besides the above, ultraviolet-curable adhesives, electron beam-curable adhesives, or the like may also be used to bond the polarizer and the transparent protective film together. Electron beam-curable adhesives for use on polarizing films have good tackiness to the various transparent protective films described above. The adhesive for use in the invention may also contain a metal compound filler.

The surface of the transparent protective film opposite to its surface to which the iodine-based polarizer is bonded may have undergone the formation of a hard coat layer, an anti-reflection treatment, an anti-sticking treatment, or a treatment for diffusion or antiglare properties.

(2) Pressure-sensitive Adhesive Layer

The pressure-sensitive adhesive layer used in the invention may have any composition as long as it has a saturated water content of 3.5% by weight or less at 60° C. and 90% R.H. The pressure-sensitive adhesive layer preferably has a saturated water content of 0 to 2% by weight, preferably 0 to 1.5% by weight, more preferably 0 to 1.0% by weight, even more preferably 0 to 0.5% by weight. The pressure-sensitive adhesive layer with a saturated water content of more than 3.5% by weight contains a relatively large amount of water and thus can easily cause iodine-induced degradation of the transparent conductive coating when the polarizing film having the pressure-sensitive adhesive layer is bonded to the transparent conductive coating.

In the invention, the pressure-sensitive adhesive layer is preferably made from a pressure-sensitive adhesive composition containing a base polymer and a crosslinking agent. The pressure-sensitive adhesive composition may include an acrylic pressure-sensitive adhesive, a synthetic rubber-based pressure-sensitive adhesive, a rubber-based pressure-sensitive adhesive, a silicone-based pressure-sensitive adhesive, or other pressure-sensitive adhesives. In view of transparency, heat resistance, and other properties, an acrylic pressure-sensitive adhesive containing a (meth)acrylic polymer as a base polymer is preferred.

The (meth)acryl-based polymer as a base polymer for the acrylic pressure-sensitive adhesive is preferably obtained by polymerization of a monomer composition containing a (meth)acrylic ester having an alkyl group of 2 to 14 carbon atoms, more preferably obtained by polymerization of a monomer composition containing, as a principal monomer, a (meth)acrylic ester having an alkyl group of 2 to 14 carbon atoms. In this aspect, the content of the principal monomer is preferably 60% by weight or more, more preferably 70% by weight or more, based on the total weight of all the monomers used to form the (meth)acryl-based polymer. As used herein, the term "(meth)acrylic ester" refers to an acrylic ester and/or a methacrylic ester, and "(meth)" is used in the same meaning in the description.

Examples of the (meth)acrylic ester having an alkyl group of 2 to 14 carbon atoms include ethyl(meth)acrylate, n-butyl (meth)acrylate, tert-butyl (meth)acrylate, isobutyl (meth) acrylate, hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth) acrylate, isodecyl (meth)acrylate, n-dodecyl (meth)acrylate, n-tridecyl (meth)acrylate, n-tetradecyl (meth)acrylate, etc. These may be used singly or in combination of two or more. In particular, a (meth)acrylic ester having an alkyl group of 4 to 14 carbon atoms is more preferred because of its stronger hydrophobicity.

The monomer composition may contain an additional polymerizable monomer other than the (meth)acrylic ester having an alkyl group of 2 to 14 carbon atoms. The additional polymerizable monomer maybe of any type having an unsaturated double bond-containing polymerizable functional group such as a (meth)acryloyl group or a vinyl group. The additional polymerizable monomer may be, for example, a hydroxyl group-containing monomer or a carboxyl group-containing monomer.

Any monomer having a hydroxyl group and an unsaturated double bond-containing polymerizable functional group such as a (meth)acryloyl group or a vinyl group may be used without restriction as the hydroxyl group-containing monomer. Examples of the hydroxyl group-containing monomer include hydroxyalkyl (meth)acrylate such as 2-hydroxyethyl (meth)acrylate, 3-hydroxypropyl (meth)acrylate, 4-hydroxybutyl (meth)acrylate, 6-hydroxyhexyl (meth) acrylate, 8-hydroxyoctyl (meth)acrylate, 10-hydroxydecyl (meth)acrylate, or 12-hydroxylauryl (meth)acrylate; and (4-hydroxymethylcyclohexyl)methyl (meth)acrylate. These may be used alone or in any combination. The hydroxyl group-containing monomer is preferred because it is effective in increasing the adhesion to the transparent conductive coating (particularly ITO). In particular, a hydroxyl group-containing acrylic monomer having a side chain of 4 or more carbon atoms is preferred because it has stronger hydrophilicity and is highly effective in increasing the adhesion to the transparent conductive coating.

The content of the hydroxyl group-containing monomer in the monomer composition is preferably 10% by weight or less, more preferably 0 to 5% by weight, even more preferably 0.1 to 2% by weight. In a preferred mode of the invention, specifically, the hydrophilicity of the pressure-sensitive adhesive composition can be adjusted using the hydroxyl group-containing acrylic monomer having a side chain of 4 or more carbon atoms at a content in the above range, so that the saturated water content of the pressure-sensitive adhesive layer, which is made from the pressure-sensitive adhesive composition, can be adjusted.

Any monomer having a carboxyl group and an unsaturated double bond-containing polymerizable functional group such as a (meth)acryloyl group or a vinyl group may be used without restriction as the carboxyl group-containing monomer. Examples of the carboxyl group-containing monomer include acrylic acid, methacrylic acid, carboxyethyl (meth)acrylate, carboxypentyl (meth)acrylate, itaconic acid, maleic acid, fumaric acid, and crotonic acid. These may be used alone or in any combination.

The content of the carboxyl group-containing monomer in the monomer composition is preferably 5% by weight or less. If the content of the carboxyl group-containing monomer in the monomer composition is more than 5% by weight, the pressure-sensitive adhesive composition can have higher hydrophilicity, so that the pressure-sensitive adhesive layer made from the pressure-sensitive adhesive composition may tend to have a higher water content, which is not preferred.

Other copolymerizable monomers maybe of any type having an unsaturated double bond-containing polymerizable functional group such as a (meth)acryloyl group or a vinyl group. Examples of such other copolymerizable monomers include alicyclic hydrocarbon esters of (meth)acrylic acid, such as cyclohexyl (meth)acrylate, bornyl (meth)acrylate, and isobornyl (meth)acrylate; aryl( meth)acrylate such as phenyl (meth)acrylate; vinyl esters such as vinyl acetate and vinyl propionate; styrene monomers such as styrene; epoxy group-containing monomers such as glycidyl (meth) acrylate and methylglycidyl (meth)acrylate; amide group-containing monomers such as acrylamide, diethylacrylamide, acryloyl morpholine (ACMO), and N-vinylpyrrolidone (NVP); amino group-containing monomers such as N,N-dimethylaminoethyl (meth)acrylate and N,N-dimethylaminopropyl (meth)acrylate; cyclic nitrogen-containing monomers such as N-vinylpyrrolidone, N-vinyl-ε-caprolactam, and methyl vinyl pyrrolidone; alkoxy group-containing monomers such as methoxyethyl (meth)acrylate and ethoxyethyl (meth)acrylate; cyano group-containing monomers such as acrylonitrile and methacrylonitrile; functional monomers such as 2-methacryloyloxyethyl isocyanate; olefin monomers such as ethylene, propylene, isoprene, butadiene, and isobutylene; vinyl ether monomers such as vinyl ether; halogen atom-containing monomers such as vinyl chloride; and N-vinylcarboxylic acid amides.

Examples of copolymerizable monomers also include maleimide monomers such as N-cyclohexylmaleimide, N-isopropylmaleimide, N-laurylmaleimide, and N-phenylmaleimide; itaconimide monomers such as N-methylitaconimide, N-ethylitaconimide, N-butylitaconimide, N-octylitaconimide, N-2-ethylhexylitaconimide, N-cyclohexylitaconimide, and N-laurylitaconimide; succinimide monomers such as N-(meth)acryloyloxymethylenesuccinimide, N-(meth)acryloyl-6-oxyhexamethylenesuccinimide, and N-(meth)acryloyl-8-oxyoctamethylenesuccinimide; and sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl (meth)acrylate, and (meth)acryloyloxynaphthalenesulfonic acid.

Examples of copolymerizable monomers also include glycol acrylate monomers such as polyethylene glycol (meth)acrylate, polypropylene glycol (meth)acrylate, methoxyethylene glycol (meth)acrylate, and methoxypolypropylene glycol (meth)acrylate; and other monomers such as acrylic ester monomers containing a heterocyclic ring or a halogen atom, such as tetrahydrofurfuryl (meth)acrylate and fluoro(meth)acrylate.

Polyfunctional monomers may also be used as copolymerizable monomers. Polyfunctional monomers may be compounds having two or more unsaturated double bonds such as those in (meth)acryloyl groups or vinyl groups. Examples of such polyfunctional monomers include (mono or poly)alkylene glycol di(meth)acrylates including (mono or poly)ethylene glycol di(meth)acrylates such as ethylene glycol di(meth)acrylate, diethylene glycol di(meth)acrylate, triethylene glycol di(meth)acrylate, trimethylolpropane tri (meth)acrylate, and tetraethylene glycol di(meth)acrylate, and (mono or poly)propylene glycol di(meth)acrylates such as propylene glycol di(meth)acrylate; (meth)acrylic esters of polyhydric alcohols, such as neopentyl glycol di(meth) acrylate, 1,6-hexanediol di(meth)acrylate, pentaerythritol di(meth)acrylate, trimethylolpropane tri(meth)acrylate, pentaerythritol tri(meth)acrylate, and dipentaerythritol hexa(meth)acrylate; polyfunctional vinyl compounds such as divinylbenzene; and reactive unsaturated double bond-containing compounds such as ally(meth)acrylate and vinyl (meth)acrylate. Examples of polyfunctional monomers that may also be used include polyester(meth)acrylates, epoxy (meth)acrylates, urethane (meth)acrylates, or other compounds having a polyester, epoxy, or urethane skeleton, to which two or more unsaturated double bonds are added in the form of functional groups such as (meth)acryloyl groups or vinyl groups in the same manner as the constituent monomers.

The content of the copolymerizable monomer other than the hydroxyl group-containing monomer or the carboxyl group-containing monomer in the monomer composition is preferably 40% by weight or less, more preferably 0 to 30% by weight, even more preferably 0 to 10% by weight. The amide group-containing monomer or the amino group-containing monomer, which may increase the hydrophilicity of the pressure-sensitive adhesive composition, preferably makes up 10% by weight or less, more preferably 8% by weight or less of the monomer composition.

The (meth)acryl-based polymer used in the invention preferably has a weight average molecular weight of 1,200,000 to 3,000,000, more preferably 1,200,000 to 2,700,000, even more preferably 1,200,000 to 2,500,000. A weight average molecular weight of less than 1,200,000 may be undesirable for heat resistance. If the weight average molecular weight is less than 1,200,000, the pressure-sensitive adhesive composition may contain a relatively large amount of low molecular weight components, which may bleed out of the pressure-sensitive adhesive layer to degrade transparency. If the weight average molecular weight is less than 1,200,000, the pressure-sensitive adhesive layer produced with the (meth)acryl-based polymer may have a low level of solvent resistance or mechanical properties. If the weight average molecular weight is more than 3,000,000, a large amount of a diluent solvent can be necessary for adjusting the viscosity to be suitable for coating, which is not preferred in view of cost. The weight average molecular weight in the above range is also preferred in view of corrosion resistance or durability. The weight average molecular weight refers to a polystyrene-equivalent molecular weight as measured and calculated using gel permeation chromatography (GPC).

The (meth)acryl-based polymer described above can be produced by any method appropriately selected from known methods such as solution polymerization, bulk polymerization, emulsion polymerization, and various types of radial polymerization. In the invention, solution polymerization is preferred in view of the water content of the pressure-sensitive adhesive layer. The resulting (meth)acryl-based polymer may be a random copolymer, a block copolymer, a graft copolymer, or any other form.

In a solution polymerization process, ethyl acetate, toluene or the like is used as a polymerization solvent. In a specific solution polymerization process, for example, the reaction is performed under a stream of inert gas such as nitrogen at a temperature of about 50 to about 70° C. for about 5 to about 30 hours in the presence of a polymerization initiator.

Any appropriate polymerization initiator, chain transfer agent, emulsifying agent and so on may be selected and used for radical polymerization. The weight average molecular weight of the (meth)acryl-based polymer may be controlled by the reaction conditions including the amount of addition of the polymerization initiator or the chain transfer agent. The amount of the addition may be controlled as appropriate depending on the type of these materials.

Examples of the polymerization initiator include, but are not limited to, azo initiators such as 2,2'-azobisisobutyronitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine)disulfate, 2,2'-azobis(N,N'-dimethyleneisobutylamidine), and 2,2'-azobis[N-(2-carboxyethyl)-2-methylpropionamidine]hydrate (trade name: VA-057, manufactured by Wako Pure Chemical Industries, Ltd.); persulfates such as potassium persulfate and ammonium persulfate; peroxide initiators such as di(2-ethylhexyl)peroxydicarbonate, di(4-tert-butylcyclohexyl)peroxydicarbonate, di-sec-butylperoxydicarbonate, tert-butylperoxyneodecanoate, tert-hexylperoxypivalate, tert-butylperoxypivalate, dilauroyl peroxide, di-n-octanoyl peroxide, 1,1,3,3-tetramethylbutylperoxy-2-ethyl hexanoate, di(4-methylbenzoyl) peroxide, dibenzoyl peroxide, tert-butylperoxyisobutylate, 1,1-di(tert-hexylperoxy)cyclohexane, tert-butylhydroperoxide, and hydrogen peroxide; and redox system initiators of a combination of a peroxide and a reducing agent, such as a combination of a persulfate and sodium hydrogen sulfite and a combination of a peroxide and sodium ascorbate.

One of the above polymerization initiators may be used alone, or two or more thereof may be used in a mixture. The total content of the polymerization initiator is preferably from about 0.005 to 1 part by weight, based on 100 parts by total weight of the monomer component used to form the (meth)acryl-based polymer.

Examples of the chain transfer agent include lauryl mercaptan, glycidyl mercaptan, mercaptoacetic acid, 2-mercaptoethanol, thioglycolic acid, 2-ethylhexyl thioglycolate and 2,3-dimercapto-1-propanol. One of these chain transfer agents may be used alone, or two or more thereof may be used in a mixture. The total content of the chain transfer agent is preferably about 0.1 parts by weight or less, based on 100 parts by total weight of the monomer component.

The pressure-sensitive adhesive composition used in the invention may contain a variety of silane coupling agent in order to improve the adhesion under high-temperature and humidity condition. As the silane coupling agent, a silane coupling agent having any appropriate functional group can be used. Specific examples of the functional group include a vinyl group, an epoxy group, an amino group, a mercapto group, a (meth)acryloxy, an acetoacetyl group, an isocyanate group, a styryl group, and a polysulfide group. Specific examples include vinyl group-containing silane coupling agents such as vinyltriethoxysilane, vinyltripropoxysilane, vinyltriisopropoxysilane and vinyltributoxysilane; epoxy group-containing silane coupling agents such as γ-glycidoxypropyltrimethoxysilane, γ-glycidoxypropyltriethoxysilane, 3-glycidoxypropylmethyldiethoxysilane and 2-(3,4-epoxycyclohexyl)ethyltrimethoxysilane; amino group-containing silane coupling agents such as γ-aminopropyltrimethoxysilane, N-β-(aminoethyl)-γ-aminopropylmethyldimethoxysilane, N-(2-aminoethyl)-3-aminopropylmethyldimethoxysilane, γ-triethoxysilyl-N-(1, 3-dimethylbutylidene)propylamine and N-phenyl-γ-aminopropyltrimethoxysilane; mercapto group-containing silane coupling agents such as γ-mercaptopropylmethyldimethoxysilane; styryl group-containing silane coupling agents such as p-styryltrimethoxysilane; (meth)acryl group-containing silane coupling agents such as γ-acryloxypropyltrimethoxysilane and γ-methacryloxypropyltriethoxysilane; isocyanate group-containing silane coupling agents such as 3-isocyanatepropyltriethoxysilane; and polysulfide group-containing silane coupling agents such as bis(triethoxysilylpropyl)tetrasulfide.

The silane coupling agents may be used singly or in combination of two or more. Based on 100 parts by weight (solid basis) of the base polymer, the total content of the silane coupling agent (s) is preferably 1 part by weight or less, more preferably from 0.01 to 1 part by weight, even more preferably from 0.02 to 0.8 parts by weight. If the content of the silane coupling agent is more than 1 part by weight, part of the coupling agent may remain unreacted, which is not preferred in view of durability.

When the silane coupling agent is radically copolymerizable with the above monomers, it may be used as one of the monomers. In such a case, the content of the silane coupling agent is preferably from 0.005 to 0.7 parts by weight based on 100 parts by weight (solid basis) of the base polymer.

A crosslinking agent may be further added to the pressure-sensitive adhesive composition used in the invention. The addition of the crosslinking agent is advantageous in that it can impart cohesive strength for the durability of the pressure-sensitive adhesive.

A polyfunctional compound may be used as a crosslinking agent, examples of which include an organic crosslinking agent and a polyfunctional metal chelate. Examples of the organic crosslinking agent include an epoxy crosslinking agent, an isocyanate crosslinking agent, a carbodiimide crosslinking agent, an imine crosslinking agent, an oxazoline crosslinking agent, an aziridine crosslinking agent and a peroxide crosslinking agent, etc. The polyfunctional metal chelate may comprise a polyvalent metal and an organic compound that is covalently or coordinately bonded to the metal. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. The organic compound has a covalent or coordinate bond-forming atom such as an oxygen atom.

Examples of the organic compound include an alkyl ester, an alcohol compound, a carboxylic acid compound, an ether compound, and a ketone compound. These crosslinking agents are used alone or a combination two or more. Among these, the isocyanate crosslinking agent, the peroxide crosslinking agent are preferably used, a combination of the isocyanate crosslinking agent and the peroxide crosslinking agent is more preferably used.

The term "isocyanate crosslinking agent" refers to a compound having two or more isocyanate groups (which may include functional groups that are temporarily protected with an isocyanate blocking agent or by oligomerization and are convertible to isocyanate groups) per molecule.

Isocyanate crosslinking agents include aromatic isocyanates such as tolylene diisocyanate and xylene diisocyanate, alicyclic isocyanates such as isophorone diisocyanate, and aliphatic isocyanates such as hexamethylene diisocyanate.

More specifically, examples of isocyanate crosslinking agents include lower aliphatic polyisocyanates such as butylene diisocyanate and hexamethylene diisocyanate; alicyclic isocyanates such as cyclopentylene diisocyanate, cyclohexylene diisocyanate, and isophorone diisocyanate; aromatic diisocyanates such as 2,4-tolylene diisocyanate, 4,4'-diphenylmethane diisocyanate, xylylene diisocyanate, and polymethylene polyphenyl isocyanate; isocyanate adducts such as a trimethylolpropane-tolylene diisocyanate trimer adduct (trade name: CORONATE L, manufactured by NIPPON POLYURETHANE INDUSTRY CO., LTD.), a trimethylolpropane-hexamethylene diisocyanate trimer adduct (trade name: CORONATE HL, manufactured by NIPPON POLYURETHANE INDUSTRY CO., LTD.), and an isocyanurate of hexamethylene diisocyanate (trade name: CORONATE HX, manufactured by NIPPON POLYURETHANE INDUSTRY CO., LTD.); a trimethylolpropane adduct of xylylene diisocyanate (trade name: D110N, manufactured by Mitsui Chemicals, Inc.) and a trimethylolpropane adduct of hexamethylene diisocyanate (trade name: D160N, manufactured by Mitsui Chemicals, Inc.); polyether polyisocyanate and polyester polyisocyanate; adducts thereof with various polyols; and polyisocyanates polyfunctionalized with an isocyanurate bond, a biuret bond, an allophanate bond, or the like. In particular, aliphatic isocyanates are preferably used because of their high reaction speed.

As the peroxide crosslinking agent, various kinds of peroxides are used. Examples of the peroxide include di-(2-ethylhexyl)peroxydicarbonate, di(4-t-butylcyclohexyl)peroxydicarbonate, di-sec-butyl peroxydicarbonate, t-butyl peroxyneodecanoate, t-hexyl peroxypivalate, t-butyl peroxypivalate, dilauroyl peroxide, di-n-octanoyl peroxide, 1,1,3,3-tetramethylbutyl peroxyisobutyrate, 1,1,3,3-tetramethylbutylperoxy 2-ethylhexanoate, di-(4-methylbenzoyl) peroxide, dibenzoyl peroxide and t-butyl peroxyisobutyrate. Among them, particularly, di(4-t-butylcyclohexyl)peroxydicarbonate, dilauroyl peroxide and dibenzoyl peroxide, which are excellent in crosslinking reaction efficiency, are preferably used.

The content of the crosslinking agent in the pressure-sensitive adhesive composition is generally, but not limited to, about 10 parts by weight or less (solid basis) based on 100 parts by weight (solid basis) of the base polymer. The content of the crosslinking agent is preferably from 0.01 to 10 parts by weight, more preferably from 0.01 to 5 parts by weight. Particularly when the peroxide crosslinking agent is used, its content is preferably from about 0.05 to about 1 part by weight, more preferably from 0.06 to 0.5 parts by weight, based on 100 parts by weight (solid basis) of the base polymer.

If necessary, the pressure-sensitive adhesive composition used for the invention may further appropriately contain any of various additives such as viscosity adjusting agent, releasing adjusting agent, tackifiers, plasticizers, softener, fillers including glass fibers, glass beads, metal power, or any other inorganic powder, pigments, colorants (pigments, dyes or the likes), pH adjusting agent (acid or base), antioxidants, and ultraviolet ray absorbing agents, without departing from the objects of the invention.

(3) Pressure-sensitive Adhesive Layer-bearing Polarizing Film for Transparent Conductive Coating The pressure-sensitive adhesive layer-bearing polarizing film of the invention for a transparent conductive coating can be obtained by forming a pressure-sensitive adhesive layer on at least one surface of the iodine-based polarizing film.

The pressure-sensitive adhesive layer may be formed by any method such as a method that includes applying the pressure-sensitive adhesive composition onto any of various substrates, drying the composition using a dryer such as a heating oven to remove the solvent and other volatile materials to form a pressure-sensitive adhesive layer, and transferring the pressure-sensitive adhesive layer onto the iodine-based polarizing film; or a method that includes applying the pressure-sensitive adhesive composition directly onto the iodine-based polarizing film to form a pressure-sensitive adhesive layer.

The substrate may be of any type, such as a release film or a transparent resin film substrate.

Various methods may be used to apply the pressure-sensitive adhesive composition onto the substrate or the polarizing film. Specific examples of such methods include fountain coater, roll coating, kiss roll coating, gravure coating, reverse coating, roll brush coating, spray coating, dip roll coating, bar coating, knife coating, air knife coating, curtain coating, lip coating, and extrusion coating with a die coater or the like.

The drying conditions (temperature and time) are not restricted and may be appropriately selected depending on the components, concentration, or other properties of the pressure-sensitive adhesive composition. The drying conditions are typically about 80 to about 170° C. (preferably 90 to 200° C.) for 1 to 60 minutes (preferably for 2 to 30 minutes).

For example, the thickness of the pressure-sensitive adhesive layer (after drying) is preferably from 5 to 100 μm, more preferably from 7 to 70 μm, even more preferably from 10 to 50 μm. The pressure-sensitive adhesive layer with a thickness of less than 7 μm may have poor adhesion to the adherend and tend to have insufficient durability at high temperature or at high temperature and high humidity. On the other hand, in the case of the pressure-sensitive adhesive layer with a thickness of more than 70 μm, the pressure-sensitive adhesive composition may fail to be sufficiently dried in the process of forming the pressure-sensitive adhesive layer by application and drying, so that air bubbles may remain or thickness irregularities may occur on the surface of the pressure-sensitive adhesive layer, which may easily produce a problem with appearance.

Examples of the material used to form the release film include a plastic film such as a polyethylene, polypropylene, polyethylene terephthalate, or polyester film, a porous material such as paper, fabric, or nonwoven fabric, and an appropriate thin material such as a net, a foamed sheet, a metal foil, and a laminate thereof. A plastic film is preferably used, because of its good surface smoothness.

Examples of the plastic films include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, an ethylene-vinyl acetate copolymer film, and the like.

The thickness of the release film is usually 5 to 200 μm and preferably about 5 to 100 μm. If necessary, the release film may be subjected to release and stain-resistant treatment by a silicone-based, fluorine-based, long chain alkyl-based, or fatty acid amide-based release agent, a silica powder and the like, and to antistatic treatment by application type, kneading type, and vapor deposition type treatment. Particularly, the release properties from the pressure-sensitive adhesive layer can be more improved by properly carrying out release treatment such as silicone treatment, long chain alkyl treatment, and fluorine treatment for the surface of the release film.

The transparent plastic film substrate to be used may be, but not limited to, various transparent plastic films. The plastic film is generally formed of a monolayer film. Examples of the material for the transparent plastic film substrate include polyester resins such as polyethylene terephthalate and polyethylene naphthalate, acetate resins, polyethersulfone resins, polycarbonate resins, polyamide resins, polyimide resins, polyolefin resins, (meth) acrylic resins, polyvinyl chloride resins, polyvinylidene chloride resins, polystyrene resins, polyvinyl alcohol resins, polyarylate resins, and polyphenylene sulfide resins. In particular, polyester resins, polyimide resins, and polyethersulfone resins are preferred.

The film substrate preferably has a thickness of 15 to 200 μm.

An anchor layer may be provided between the iodine-based polarizing film and the pressure-sensitive adhesive layer. Examples of materials used to form the anchor layer include, but are not limited to, various polymers, metal oxide sol, and silica sol. In particular, polymers are preferably used. Such polymers may be used in any of a solvent-soluble form, a water-dispersible form, and a water-soluble form.

Examples of such polymers include polyurethane resin, polyester resin, acrylic resin, polyether resin, cellulose resin, polyvinyl alcohol resin, polyvinyl pyrrolidone, and polystyrene resin. In particular, polyurethane resin, polyester resin, and acrylic resin are preferred. A crosslinking agent may be added as needed to any of these resins. One or more of these other binder components may be used as needed depending on the intended use. The thickness of the anchor layer is preferably, but not limited to, 5 to 300 nm.

The anchor layer may be formed by any conventionally known method. Before the anchor layer is formed, the iodine-based polarizing film may be subjected to an activation treatment. The activation treatment may be performed using various methods such as a corona treatment, a low-pressure UV treatment, and a plasma treatment.

The pressure-sensitive adhesive layer can be formed by the above method on the anchor layer provided on the iodine-based polarizing film.

When the pressure-sensitive adhesive layer of the polarizing film of the invention is exposed, a release film (separator) may be used to protect the pressure-sensitive adhesive layer until the polarizing film is actually used. The release film may be any of those listed above. When a release film is used as a substrate on which the pressure-sensitive adhesive layer is formed, the iodine-based polarizing film may be bonded to the pressure-sensitive adhesive layer on the release film, so that the release film can be used as it is for the pressure-sensitive adhesive layer of the polarizing film for use on a transparent conductive coating, which can simplify the process.

2. Laminate

The laminate of the invention includes the pressure-sensitive adhesive layer-bearing polarizing film for a transparent conductive coating and a member having a transparent conductive coating, wherein the polarizing film and the member are bonded together in such a way that the pressure-sensitive adhesive layer of the pressure-sensitive adhesive layer-bearing polarizing film is in contact with the transparent conductive coating of the member.

The pressure-sensitive adhesive layer-bearing polarizing film for a transparent conductive coating maybe as described above.

The member having a transparent conductive coating may be of any known type, such as a member including a transparent substrate such as a transparent film and a transparent conductive coating placed thereon or a member including a transparent conductive coating and a liquid crystal cell.

The transparent substrate may be of any type having transparency, such as a resin film or a substrate made of glass or the like (e.g., in the form of a sheet, a film, or a plate). A resin film is particularly preferred. The thickness of the transparent substrate is preferably, but not limited to, about 10 to about 200 μm, more preferably about 15 to 150 μm.

The material for the plastic film may be, but not limited to, various transparent plastic materials. Examples of the material for the transparent plastic film include polyester resins such as polyethylene terephthalate and polyethylene naphthalate, acetate resins, polyethersulfone resins, polycarbonate resins, polyamide resins, polyimide resins, polyolefin resins, (meth) acrylic resins, polyvinyl chloride resins, polyvinylidene chloride resins, polystyrene resins, polyvinyl alcohol resins, polyarylate resins, and polyphenylene sulfide resins. In particular, polyester resins, polyimide resins, and polyethersulfone resins are preferred.

The surface of the transparent substrate may be previously subject to sputtering, corona discharge treatment, flame treatment, ultraviolet irradiation, electron beam irradiation, chemical treatment, etching treatment such as oxidation, or undercoating treatment such that the adhesion of the transparent conductive coating formed thereon to the transparent substrate can be improved. If necessary, the transparent substrate may also be subjected to dust removing or cleaning by solvent cleaning, ultrasonic cleaning or the like, before the transparent conductive coating is formed.

The constituent material of the transparent conductive coating is not particularly limited, and a metal oxide of at least one metal selected from the group consisting of indium, tin, zinc, gallium, antimony, titanium, silicon, zirconium, magnesium, aluminum, gold, silver, copper, palladium and tungsten is used. The metal oxide may further contain metal atoms shown in the above-mentioned group as necessary. For example, indium oxide (ITO) containing tin oxide, tin oxide containing antimony, and the like are preferably used, ITO is more preferably used. ITO preferably contains 80 to 99% by weight of indium oxide and 1 to 20% by weight of tin oxide.

The ITO may be crystalline or amorphous. The crystalline ITO can be obtained by high-temperature sputtering or further heating amorphous ITO. The iodine-induced degradation can significantly occur on amorphous ITO. Therefore, the pressure-sensitive adhesive layer-bearing polarizing film of the invention is particularly advantageous for use on amorphous ITO.

The thickness of the transparent conductive coating is preferably, but not limited to, 7 nm or more, more preferably 12 to 60 nm, even more preferably 18 to 45 nm. The transparent conductive coating with a thickness of less than 7 nm may be easily degraded by iodine and tend to be more variable in electric resistance. On the other hand, the transparent conductive coating with a thickness of more than 60 nm may be produced with lower productivity at higher cost and tend to have a lower level of optical properties.

The method for forming the transparent conductive coating is not particularly limited, and a conventionally known method can be employed. Specific examples thereof include a vacuum deposition method, a sputtering method and an ion plating method. An appropriate method can also be employed according to a required thickness.

The thickness of the substrate having the transparent conductive coating may be from 15 to 200 µm. For thickness reduction, it is preferably from 15 to 150 µm, more preferably from 15 to 50 µm. When the substrate having a transparent conductive coating is used for a resistive type, the substrate typically has a thickness of 100 to 200 µm. When it is used for a capacitance type, the substrate preferably has a thickness of, for example, 15 to 100 µm, more preferably 15 to 50 µm, even more preferably 20 to 50 µm, to meet the recent requirements for thickness reduction.

If desired, an undercoat layer, an oligomer blocking layer, or other layer may be provided between the transparent conductive coating and the transparent substrate.

The member having a transparent conductive coating and a liquid crystal cell may be a product for use in image display devices such as various liquid crystal display devices. Such a product includes a liquid crystal cell having a structure of substrate (e.g., glass substrate)/liquid crystal layer/substrate and a transparent conductive coating provided on the side of the substrate opposite to its side in contact with the liquid crystal layer. When a color filter substrate is provided on the liquid crystal cell, the transparent conductive coating may be provided on the color filter. The transparent conductive coating may be formed by the above method on the substrate of the liquid crystal cell.

When the pressure-sensitive adhesive layer-bearing polarizing film of the invention is bonded to the transparent conductive coating, the rate of change of the resistance value of the transparent conductive coating is preferably less than 400%, more preferably 200% or less, even more preferably 150% or less, further more preferably 120% or less. The resistance value change rate is preferably less than 400% for the prevention of static electricity-induced unevenness or for shielding function, and preferably from 10 to 20% for sensor applications. The rate of change of the resistance value of the transparent conductive coating can be determined by the method described in the section titled "Examples."

3. Image Display Device

The laminate of the invention is advantageously used to form a substrate (member) as a component of or for use in a device such as an input device (e.g., touch panel) or an image display device (e.g., liquid display device, organic electroluminescence (EL) display device, plasma display panel (PDP), or electronic paper) equipped with an input device (e.g., touch panel). In particular, the laminate of the invention is advantageously used to form an optical substrate for use in a touch panel.

The laminate of the invention may be subjected to certain processes such as cutting, resist printing, etching, and silver ink printing. The resulting transparent conductive film may be used as a substrate (optical member) for use in an optical device. The substrate for use in an optical device may be of any type having optical properties, for example, which may be a substrate (member) as a component of or for use in a device such as an image display device (e.g., liquid display device, organic EL display device, PDP, or electronic paper) or an input device (e.g., touch panel).

As mentioned above, the pressure-sensitive adhesive layer-bearing polarizing film of the invention can prevent the degradation of a transparent conductive coating even when the transparent conductive coating is placed on the pressure-sensitive adhesive layer of the polarizing film of the invention, and can also suppress the increase in the surface resistance of the transparent conductive coating. Thus, the pressure-sensitive adhesive layer-bearing polarizing film of the invention is advantageously used to form any image display device having a structure in which a transparent conductive coating is in contact with the pressure-sensitive adhesive layer of the polarizing film. For example, an image display device can be formed by bonding the pressure-sensitive adhesive layer-bearing polarizing film of the invention to a liquid crystal panel having a transparent conductive coating in such a way that the pressure-sensitive adhesive layer is in contact with the transparent conductive coating.

The touch panel may be of any type or structure, such as a resistive touch panel, a capacitance touch panel, an on-cell touch panel having a transparent conductive coating electrode formed on the upper glass substrate of a liquid crystal cell, or an in-cell touch panel having a transparent conductive coating electrode incorporated in a liquid crystal cell.

EXAMPLES

Hereinafter, the invention will be more specifically described with reference to examples, which however are not intended to limit the gist of the invention. In each example, "parts" and "%" are all by weight. Unless otherwise specified below, the conditions for allowing to stand at room temperature are 23° C. and 65% R.H. in all cases.

<Iodine Content of Polarizer>

The iodine content of the polarizer (the content of iodine and/or iodide ions in the polarizer) was measured by the following procedure.

(1) A plurality of polarizers with predetermined potassium iodide contents were subjected to the measurement of fluorescent X-ray intensity, and a relation between the iodine content and the fluorescent X-ray intensity was derived.

(2) The iodine-based polarizer with an unknown iodine content was subjected to the measurement of fluorescent X-ray, and the iodine content was calculated from the measured value using the relation.

<Measurement of the Water-vapor Permeability of Transparent Protective Film>

The water-vapor permeability was measured using the water-vapor permeability test (cup method) according to JIS Z 0208. A 60-mm-diameter cut piece of the transparent protective film was placed in a moisture-permeable cup to which about 15 g of calcium chloride had been added. The cup was placed and stored for 24 hours in a thermostatic chamber at 60° C. and 90% R.H. The increase in the weight of the calcium chloride was measured and used in determining the water-vapor permeability ($g/(m^2 \cdot 24$ hours$)$).

<Measurement of Weight Average Molecular Weight (Mw) of Acrylic Polymer>

A weight average molecular weight of the produced polymer was measured by gel permeation chromatography (GPC).

Apparatus: HLC-8220GPC manufactured by TOSOH CORPORATION
Column:
Sample column; TSKguardcolumn Super HZ-H (one column) and TSKgel Super HZM-H (two columns), manufactured by TOSOH CORPORATION
Reference column; TSKgel Super H-RC (one column), manufactured by TOSOH CORPORATION
Flow rate: 0.6 mL/minute
Injection amount: 10 μL
Column temperature: 40° C.
Eluent: THF
Concentration of injected sample: 0.2% by weight
Detector: differential refractometer The weight average molecular weight was calculated in terms of polystyrene.

Production Example 1

Production of Polarizing Film (1)

An 80-μm-thick polyvinyl alcohol film was stretched to 3 times between rolls different in velocity ratio while it was dyed in a 0.3% iodine solution at 30° C. for 1 minute. The film was then stretched to a total stretch ratio of 6 times while it was immersed in an aqueous solution containing 4% of boric acid and 10% of potassium iodide at 60° C. for 0.5 minutes. Subsequently, the film was washed by immersion in an aqueous solution containing 1.5% of potassium iodide at 30° C. for 10 seconds and then dried at 50° C. for 4 minutes to give a 25-μm-thick polarizer (A-1) with an iodine content of 2.3% by weight. After an aqueous PVA-based resin solution was applied to one side of the polarizer (A-1), a 40-μm-thick acrylic film (250 g/(m$^2$·24 hours) in water-vapor permeability) was bonded to the one side of the polarizer (A-1) to form a polarizing film (1). The resulting polarizing film (1) had a transmittance of 43%.

Production Example 2

Production of Polarizing Film (2)

A 25-μm-thick polarizer (A-2) with an iodine content of 3.1% by weight was obtained as in Production Example 1, except that the concentration of the solutions, the immersion time, and other conditions were so controlled that a polarizing film with a transmittance of 40% could be obtained. After an aqueous PVA-based resin solution was applied to one side of the polarizer (A-2), a 40-μm-thick acrylic film (250 g/(m$^2$·24 hours) in water-vapor permeability) was bonded to the one side of the polarizer (A-2) to form a polarizing film (2). The resulting polarizing film (2) had a transmittance of 40%.

Production Example 3

Production of Polarizing Film (3)

One side of a thermoplastic resin substrate (a long amorphous polyethylene terephthalate film 100 μm in thickness, 0.60% by weight in water absorption, 80° C. in Tg) was subjected to a corona treatment. An aqueous solution of polyvinyl alcohol with a polymerization degree of 4,200 and a saponification degree of 99.2% by mole was applied to the corona-treated side and then dried to form a 10-μm-thick PVA-based resin layer, so that a laminate was obtained.

In an oven at 120° C., the resulting laminate was subjected to end-free uniaxial stretching (auxiliary in-air stretching) at a stretch ratio of 2.0 times in the lengthwise direction (longitudinal direction) between rolls with different peripheral speeds. The laminate was then immersed in an insolubilization bath (an aqueous boric acid solution obtained by adding 4 parts by weight of boric acid to 100 parts by weight of water) at a liquid temperature of 30° C. for 30 minutes (insolubilization treatment).

The insolubilized laminate was immersed in a dyeing bath (an aqueous iodine solution obtained by adding 0.2 parts by weight of iodine and 1.0 part by weight of potassium iodide to 100 parts by weight of water) at a liquid temperature of 30° C. for 60 seconds (dyeing treatment). The laminate was then immersed in a crosslinking bath (an aqueous boric acid solution obtained by adding 3 parts by weight of potassium iodide and 3 parts by weight of boric acid to 100 parts by weight of water) at a liquid temperature of 30° C. for 30 seconds (crosslinking treatment).

The laminate was then uniaxially stretched to a total stretch ratio of 5.5 times in the lengthwise direction (longitudinal direction) between rolls with different peripheral speeds while it was immersed in an aqueous boric acid solution (an aqueous solution obtained by adding 4 parts by weight of boric acid and 5 parts by weight of potassium iodide to 100 parts by weight of water) at a liquid temperature of 70° C. (in-water stretching). The laminate was then immersed in a cleaning bath (an aqueous solution obtained by adding 4 parts by weight of potassium iodide to 100 parts by weight of water) at a liquid temperature of 30° C. (cleaning treatment).

After the series of treatments, an optical film laminate including a resin substrate and a 5-μm-thick polarizer (B-1) with an iodine content of 8% by weight placed thereon was obtained.

Subsequently, an aqueous PVA-based resin solution was applied to one side of the polarizer (B-1) of the resulting optical film laminate, and then a 40-μm-thick acrylic film (250 g/(m$^2$·24 hours) in water-vapor permeability) was laminated to the one side of the polarizer (B-1). The resulting laminate was heated in an oven kept at 60° C. for 5 minutes. The thermoplastic resin substrate was then peeled off from the laminate, so that a polarizing film (3) was obtained. The resulting polarizing film (3) had a transmittance of 43%.

Production Example 4

Production of Polarizing Film (4)

A 5-μm-thick polarizer (B-2) with an iodine content of 11% by weight was obtained as in Production Example 3, except that the concentration of the solutions, the immersion time, and other conditions were so controlled that a polarizing film with a transmittance of 40% could be obtained. After an aqueous PVA-based resin solution was applied to one side of the polarizer (B-2), a 40-μm-thick acrylic film (250 g/(m$^2$·24 hours) in water-vapor permeability) was laminated to the one side of the polarizer (B-2). The resulting laminate was heated in an oven kept at 60° C. for 5 minutes. The thermoplastic resin substrate was then peeled off from the laminate, so that a polarizing film (4) was obtained. The resulting polarizing film (4) had a transmittance of 40%.

Production Example 5

Production of Polarizing Film (5)

A 5-μm-thick polarizer (B-3) with an iodine content of 5% by weight was obtained as in Production Example 3, except that the concentration of the solutions, the immersion time, and other conditions were so controlled that a polarizing film with a transmittance of 45% could be obtained. After an aqueous PVA-based resin solution was applied to one side of the polarizer (B-3), a 40-μm-thick acrylic film (250 g/(m²·24 hours)) in water-vapor permeability) was laminated to the one side of the polarizer (B-3). The resulting laminate was heated in an oven kept at 60° C. for 5 minutes. The thermoplastic resin substrate was then peeled off from the laminate, so that a polarizing film (5) was obtained. The resulting polarizing film (5) had a transmittance of 45%.

Production Example 6

Production of Polarizing Film (6)

A polarizing film (6) was obtained as in Production Example 3, except that a 40-μm-thick cycloolefin polymer (COP)-based film (10 g/(m²·24 hours)) in water-vapor permeability) was used as the transparent protective film instead of the 40-μm-thick acrylic film (250 g/(m²·24 hours)) in water-vapor permeability). The resulting polarizing film (6) had a water-vapor transmittance of 43%.

Production Example 7

Production of Polarizing Film (7)

A polarizing film (7) was obtained as in Production Example (3), except that a 40-μm-thick saponified triacetyl-cellulose film coated with an acrylic polymer thin layer (TAC-HC, 10 μm in acrylic coating thickness, 700 g/(m²·24 hours)) in water-vapor permeability) was used as the transparent protective film instead of the 40-μm-thick acrylic film (250 g/(m²·24 hours)) in water-vapor permeability). The resulting polarizing film (7) had a water-vapor transmittance of 43%.

Production Example 8

Production of Polarizing Film (8)

A polarizing film (8) was obtained as in Production Example (3), except that a 20-μm-thick acrylic film (470 g/(m²·24 hours)) was used as the transparent protective film instead of the 40-μm-thick acrylic film (250 g/(m²·24 hours)) in water-vapor permeability). The resulting polarizing film (8) had a water-vapor transmittance of 43%.

Production Example 9

Production of Polarizing Film (9)

A polarizing film (9) was obtained as in Production Example (4), except that a 40-μm-thick saponified triacetyl-cellulose film (1200 g/(m²·24 hours)) in water-vapor permeability) was used as the transparent protective film instead of the 40-μm-thick acrylic film (250 g/(m²·24 hours)) in water-vapor permeability). The resulting polarizing film (9) had a water-vapor transmittance of 40%.

Production Example 10

Production of Polarizing Film (10)

A 5-μm-thick polarizer (B-4) with an iodine content of 15% by weight was obtained as in Production Example 3, except that the concentration of the solutions, the immersion time, and other conditions were so controlled that a polarizing film with a transmittance of 38% could be obtained. A 40-μm-thick acrylic film (250 g/(m²·24 hours)) in water-vapor permeability) was bonded to one side of the polarizer (B-4) to form a polarizing film (10). The resulting polarizing film (10) had a transmittance of 38%.

The polarizing films (1) to (10) obtained in Production Examples 1 to 10 are as follows.

TABLE 1

| | | Transparent protective film | | | Polarizer | | | |
| --- | --- | --- | --- | --- | --- | --- | --- | --- |
| | | Type | Thickness (μm) | Water-vapor permeability (g/(m² · 24 h)) | Type | Iodine content (wt %) | Thickness (μm) | Transmittance (%) |
| Production Example 1 | Polarizing film (1) | Acrylic | 40 | 250 | Polarizer (A-1) | 2.3 | 25 | 43 |
| Production Example 2 | Polarizing film (2) | Acrylic | 40 | 250 | Polarizer (A-2) | 3.1 | 25 | 40 |
| Production Example 3 | Polarizing film (3) | Acrylic | 40 | 250 | Polarizer (B-1) | 8 | 5 | 43 |
| Production Example 4 | Polarizing film (4) | Acrylic | 40 | 250 | Polarizer (B-2) | 11 | 5 | 40 |
| Production Example 5 | Polarizing film (5) | Acrylic | 40 | 250 | Polarizer (B-3) | 5 | 5 | 45 |
| Production Example 6 | Polarizing film (6) | COP | 40 | 10 | Polarizer (B-1) | 8 | 5 | 43 |
| Production Example 7 | Polarizing film (7) | TAC-HC | 40 | 700 | Polarizer (B-1) | 8 | 5 | 43 |
| Production Example 8 | Polarizing film (8) | Acrylic | 20 | 470 | Polarizer (B-1) | 8 | 5 | 43 |
| Production Example 9 | Polarizing film (9) | TAC | 40 | 1200 | Polarizer (B-2) | 11 | 5 | 40 |
| Production Example 10 | Polarizing film (10) | Acrylic | 40 | 250 | Polarizer (B-4) | 15 | 5 | 38 |

Example 1

(Preparation of Acrylic Pressure-sensitive Adhesive Composition)

A reaction vessel equipped with a condenser tube, a nitrogen introducing tube, a thermometer, and a stirrer was charged with 84.95 parts by weight of butyl acrylate, 0.05 parts by weight of acrylic acid, 5 parts by weight of 4-hydroxybutyl acrylate, 10 parts by weight of N-vinyl-2-pyrrolidone, and 0.1 parts of AIBN as an initiator (based on 100 parts (solid basis) of the monomers) together with ethyl acetate. The mixture was allowed to react at 55° C. for 7 hours under a nitrogen gas stream. Ethyl acetate was then added to the reaction liquid to form a solution containing an acryl-based polymer with a weight average molecular weight of 1,600,000 (30% by weight in solid concentration). Based on 100 parts of the solid in the acryl-based polymer solution, 0.2 parts by weight of dibenzoyl peroxide (NYPER BMT (trade name) manufactured by NOF CORPORATION) as a peroxide crosslinking agent, 0.1 parts of trimethylolpropane xylylene diisocyanate (Takenate D110N (trade name) manufactured by Mitsui Chemicals, Inc.) as an isocyanate crosslinking agent, and 0.08 parts of a silane coupling agent (KBM-403 (trade name) manufactured by Shin-Etsu Chemical Co., Ltd.) were added to the acryl-based polymer solution to form an acrylic pressure-sensitive adhesive composition (1).

(Preparation of Pressure-sensitive Adhesive Layer-bearing Polarizing Film)

The acrylic pressure-sensitive adhesive composition (1) was uniformly applied to the surface of a silicone release agent-treated polyethylene terephthalate film (substrate) with a fountain coater and then dried in an air circulation-type thermostatic oven at 155° C. for 2 minutes, so that a 20-μm-thick pressure-sensitive adhesive layer was formed on the surface of the substrate. Subsequently, the pressure-sensitive adhesive layer-bearing separator film was bonded to the surface (polarizer surface) of the polarizing film (1) (obtained in Production Example 1) opposite to its surface covered with the transparent protective film, so that a pressure-sensitive adhesive layer-bearing polarizing film was obtained. The resulting pressure-sensitive adhesive layer had a water content of 1.3% by weight.

Example 2

(Preparation of Acrylic Pressure-sensitive Adhesive Composition)

A reaction vessel equipped with a condenser tube, a nitrogen introducing tube, a thermometer, and a stirrer was charged with 99 parts by weight of butyl acrylate, 1 part by weight of 4-hydroxybutyl acrylate, and 0.1 parts of AIBN as an initiator (based on 100 parts (solid basis) of the monomers) together with ethyl acetate. The mixture was allowed to react at 60° C. for 7 hours under a nitrogen gas stream. Ethyl acetate was then added to the reaction liquid to form a solution containing an acryl-based polymer with a weight average molecular weight of 1,600,000 (30% by weight in solid concentration). Based on 100 parts of the solid in the acryl-based polymer solution, 0.1 parts of trimethylolpropane xylylene diisocyanate (Takenate D110N (trade name) manufactured by Mitsui Chemicals, Inc.) and 0.3 parts of dibenzoyl peroxide as a crosslinking agent, 0.075 parts of γ-glycidoxypropyltrimethoxysilane (KBM-403 (trade name) manufactured by Shin-Etsu Chemical Co., Ltd.) as a silane coupling agent, and 0.3 parts of pentaerythritol tetrakis[3-(3,5-di-tert-butyl-4-hydroxyphenyl)propionate] (IRGANOX 1010 manufactured by BASF Japan Ltd.) as a phenolic antioxidant were added to the acryl-based polymer solution to form an acrylic pressure-sensitive adhesive composition (2).

(Preparation of Pressure-sensitive Adhesive Layer-bearing Polarizing Film)

A pressure-sensitive adhesive layer-bearing polarizing film was prepared as in Example 1, except that the acrylic pressure-sensitive adhesive composition (2) was used instead of the acrylic pressure-sensitive adhesive composition (1) in the preparation of the pressure-sensitive adhesive layer-bearing polarizing film. The resulting pressure-sensitive adhesive layer had a water content of 0.7% by weight.

Example 3

(Preparation of Acrylic Pressure-sensitive Adhesive Composition)

A reaction vessel equipped with a condenser tube, a nitrogen introducing tube, a thermometer, and a stirrer was charged with 99.9 parts of 2-ethylhexyl acrylate, 0.1 parts of 6-hydroxyhexyl acrylate, and 0.1 parts of AIBN as an initiator (based on 100 parts (solid basis) of the monomers) together with ethyl acetate. The mixture was allowed to react at 60° C. for 7 hours under a nitrogen gas stream. Ethyl acetate was then added to the reaction liquid to form a solution containing an acryl-based polymer with a weight average molecular weight of 1,800,000 (30% by weight in solid concentration). Based on 100 parts of the solid in the acryl-based polymer solution, 0.1 parts of trimethylolpropane-tolylene diisocyanate adduct (CORONATE L (trade name) manufactured by Nippon Polyurethane Industry Co., Ltd.) as a crosslinking agent, 0.03 parts of a dioctyltin dilaurate crosslinking accelerator (EMBILIZER OL-1 (trade name) manufactured by Tokyo Fine Chemical CO., LTD.), and 0.01 parts of γ-glycidoxypropyltrimethoxysilane (KBM-403 (trade name) manufactured by Shin-Etsu Chemical Co., Ltd.) as a silane coupling agent were added to the acryl-based polymer solution to form an acrylic pressure-sensitive adhesive composition (3).

(Preparation of Pressure-sensitive Adhesive Layer-bearing Polarizing Film)

A pressure-sensitive adhesive layer-bearing polarizing film was prepared as in Example 1, except that the acrylic pressure-sensitive adhesive composition (3) was used instead of the acrylic pressure-sensitive adhesive composition (1) in the preparation of the pressure-sensitive adhesive layer-bearing polarizing film. The resulting pressure-sensitive adhesive layer had a water content of 0.3% by weight.

Examples 4 to 7

Pressure-sensitive adhesive layer-bearing polarizing films were prepared as in Example 1, except that each of the polarizing films (2) to (5) obtained in Production Examples 2 to 5 was used instead of the polarizing film (1) in the preparation of the pressure-sensitive adhesive layer-bearing polarizing film. All the resulting pressure-sensitive adhesive layers had a water content of 1.3% by weight.

Example 8

(Preparation of Acrylic Pressure-sensitive Adhesive Composition)

A reaction vessel equipped with a condenser tube, a nitrogen introducing tube, a thermometer, and a stirrer was charged with 84.95 parts by weight of butyl acrylate, 0.05 parts by weight of acrylic acid, 5 parts by weight of hydroxyethyl acrylate, 10 parts by weight of N-vinyl-2-pyrrolidone, and 0.1 parts of AIBN as an initiator (based on 100 parts (solid basis) of the monomers) together with ethyl acetate. The mixture was allowed to react at 55° C. for 7 hours under a nitrogen gas stream. Ethyl acetate was then added to the reaction liquid to form a solution containing an acryl-based polymer with a weight average molecular weight of 1,600,000 (30% by weight in solid concentration). Based on 100 parts of the solid in the acryl-based polymer solution, 0.2 parts by weight of dibenzoyl peroxide (NYPER BMT (trade name) manufactured by NOF CORPORATION) as a peroxide crosslinking agent, 0.1 parts of trimethylolpropane xylylene diisocyanate (Takenate D110N (trade name) manufactured by Mitsui Chemicals, Inc.) as an isocyanate crosslinking agent, and 0.08 parts of a silane coupling agent (KBM-403 (trade name) manufactured by Shin-Etsu Chemical Co., Ltd.) were added to the acryl-based polymer solution to form an acrylic pressure-sensitive adhesive composition (4).

(Preparation of Pressure-sensitive Adhesive Layer-bearing Polarizing Film)

A pressure-sensitive adhesive layer-bearing polarizing film was prepared as in Example 1, except that the acrylic pressure-sensitive adhesive composition (4) and the polarizing film (3) obtained in Production Example 3 were used instead of the acrylic pressure-sensitive adhesive composition (1) and the polarizing film (1), respectively, in the preparation of the pressure-sensitive adhesive layer-bearing polarizing film. The resulting pressure-sensitive adhesive layer had a water content of 1.3% by weight.

Example 9

A pressure-sensitive adhesive layer-bearing polarizing film was prepared as in Example 2, except that the polarizing film (3) obtained in Production Example 3 was used instead of the polarizing film (1) in the preparation of the pressure-sensitive adhesive layer-bearing polarizing film. The resulting pressure-sensitive adhesive layer had a water content of 0.7% by weight.

Example 10

A pressure-sensitive adhesive layer-bearing polarizing film was prepared as in Example 3, except that the polarizing film (3) obtained in Production Example 3 was used instead of the polarizing film (1) in the preparation of the pressure-sensitive adhesive layer-bearing polarizing film. The resulting pressure-sensitive adhesive layer had a water content of 0.3% by weight.

Example 11

A pressure-sensitive adhesive layer-bearing polarizing film was prepared as in Example 2, except that the polarizing film (4) obtained in Production Example 4 was used instead of the polarizing film (1) in the preparation of the pressure-sensitive adhesive layer-bearing polarizing film. The resulting pressure-sensitive adhesive layer had a water content of 0.7% by weight.

Examples 12 to 14

Pressure-sensitive adhesive layer-bearing polarizing films were prepared as in Example 1, except that the polarizing films (6) to (8) obtained in Production Examples 6 to 8 was used instead of the polarizing film (1) in the preparation of the pressure-sensitive adhesive layer-bearing polarizing film. The all resulting pressure-sensitive adhesive layers had a water content of 1.3% by weight.

Example 15

(Preparation of Monomer Composition for Use in UV Polymerization)

To a four-neck flask were added 61 parts by weight of 2-ethylhexyl acrylate, 14 parts by weight of N-vinyl-2-pyrrolidone, 0.05 parts by weight of each of two photopolymerization initiators (IRGACURE 184 (trade name) manufactured by BASF and IRGACURE 651 (trade name) manufactured by BASF), so that a monomer mixture was obtained. Subsequently, the monomer mixture was partially photo-polymerized by being exposed to ultraviolet rays in a nitrogen atmosphere, so that a partially polymerized product (acryl-based polymer syrup) was obtained with a conversion of about 10% by weight. To the resulting acryl-based polymer syrup (75.1 parts by weight) were added 3 parts by weight of 2-hydroxyethyl acrylate (2HEA), 22 parts by weight of 4-hydroxybutyl acrylate (HBA), and 0.12 parts by weight of dipentaerythritol pentaacrylate (KAYARAD DPHA (trade name) manufactured by Nippon Kayaku Co., Ltd.). Subsequently, these materials were uniformly mixed to form a monomer composition.

(Preparation of Pressure-sensitive Adhesive Layer Using UV Polymerization)

Subsequently, a 38-μm-thick polyester film (Diafoil MRF (trade name) manufactured by Mitsubishi Plastics, Inc.) with its one side release-treated with silicone was provided, and the monomer composition prepared as described above was applied to the release-treated surface of the polyester film so that a coating layer with a final thickness of 20 μm could be formed. Subsequently, a 38-μm-thick polyester film (Diafoil MRE (trade name) manufactured by Mitsubishi Plastics, Inc.) with its one side release-treated with silicone was provided, and the surface of the applied monomer composition was covered with the polyester film in such a manner that the release-treated surface of the film faced the coating layer. As a result, the coating layer of the monomer composition was shielded from oxygen. The sheet having the coating layer obtained as described above was irradiated with ultraviolet rays from a chemical light lamp (manufactured by TOSHIBA CORPORATION) at an irradiance of 5 mW/cm$^2$ (as measured using TOPCON UVR-T1 having a maximum sensitivity at about 350 nm) for 360 seconds, so that the coating layer was cured to form a pressure-sensitive adhesive layer, and thus a pressure-sensitive adhesive sheet was obtained. The polyester films placed over both sides of the pressure-sensitive adhesive layer function as release liners (separators).

(Preparation of Pressure-sensitive Adhesive Layer-bearing Polarizing Film)

Only one of the separators was peeled off from the pressure-sensitive adhesive layer. The pressure-sensitive adhesive layer-bearing separator was then bonded to the surface (polarizer surface) of the polarizing film (3) (obtained in Production Example 3) opposite to its surface covered with the transparent protective film, so that a pressure-sensitive adhesive layer-bearing polarizing film was obtained. The resulting pressure-sensitive adhesive layer had a water content of 3.1% by weight.

Comparative Example 1

A pressure-sensitive adhesive layer-bearing polarizing film was prepared as in Example 1, except that the polarizing film (9) obtained in Production Example 9 was used instead of the polarizing film (1) in the preparation of the pressure-sensitive adhesive layer-bearing polarizing film. The resulting pressure-sensitive adhesive layer had a water content of 1.3% by weight.

Comparative Example 2

(Preparation of Emulsion-type Acrylic Pressure-sensitive Adhesive Composition)

To a vessel were added 780 parts of butyl acrylate, 200 parts of methyl methacrylate, and 20 parts of acrylic acid and mixed to form a monomer mixture. To 1,000 parts of the monomer mixture prepared with the above composition were then added 30 parts of AQUALON HS-10 (manufactured by Dai-ichi Kogyo Seiyaku Co., Ltd.) as a reactive surfactant and 635 parts of ion-exchanged water. The resulting mixture was stirred at 6,000 (rpm) for 5 minutes using a homo mixer (manufactured by PRIMIX Corporation) to form a monomer emulsion. A reaction vessel equipped with a condenser tube, a nitrogen introducing tube, a thermometer, a dropping funnel, and a stirring blade was charged with 200 parts of the prepared monomer emulsion and 515.9 parts of ion-exchanged water. Subsequently, after the air in the reaction vessel was sufficiently replaced with nitrogen gas, 0.6 parts of ammonium persulfate was added to the reaction vessel. The mixture was subjected to polymerization at 60° C. for 1 hour with stirring. Subsequently, the remaining part of the monomer emulsion was added dropwise over 3 hours to the reaction vessel being kept at 60° C. The mixture was then subjected to polymerization for 3 hours to form a polymer emulsion with a solid concentration of 46.2%. Subsequently, after the polymer emulsion was cooled to room temperature, 10% ammonia water was added thereto to adjust pH to 8, so that an emulsion-type acrylic pressure-sensitive adhesive with an adjusted solid content of 45.6% was obtained.

(Preparation of Pressure-sensitive Adhesive Layer-bearing Polarizing Film)

The emulsion-type acrylic pressure-sensitive adhesive was applied onto a release film (Diafoil MRF-38 (trade name), polyethylene terephthalate substrate, manufactured by Mitsubishi Plastics, Inc.) with a die coater so that a 20-μm-thick coating could be formed after drying. The emulsion-type acrylic pressure-sensitive adhesive was then dried at 120° C. for 5 minutes to form a pressure-sensitive adhesive layer. The pressure-sensitive adhesive layer-bearing separator was then bonded to the surface (polarizer surface) of the polarizing film (4) (obtained in Production Example 4) opposite to its surface covered with the transparent protective film, so that a pressure-sensitive adhesive layer-bearing polarizing film was obtained. The resulting pressure-sensitive adhesive layer had a water content of 5.0% by weight.

(Preparation of Pressure-sensitive Adhesive Layer-bearing Polarizing Film)

A pressure-sensitive adhesive layer-bearing polarizing film was prepared as in Example 1, except that the acrylic pressure-sensitive adhesive composition (5) and the polarizing film (4) obtained in Production Example 4 were used instead of the acrylic pressure-sensitive adhesive composition (1) and the polarizing film (1), respectively, in the preparation of the pressure-sensitive adhesive layer-bearing polarizing film. The resulting pressure-sensitive adhesive layer had a water content of 3.2% by weight.

Comparative Example 3

A pressure-sensitive adhesive layer-bearing polarizing film was prepared as in Example 1, except that the polarizing film (10) obtained in Production Example 10 was used instead of the polarizing film (1) in the preparation of the pressure-sensitive adhesive layer-bearing polarizing film. The resulting pressure-sensitive adhesive layer had a water content of 1.3% by weight.

The pressure-sensitive adhesive layer-bearing polarizing films obtained in the examples and the comparative examples were subjected to the ITO glass degradation test described below. Table 2 shows the results.

<Method for Determining the Saturated Water Content of Pressure-sensitive Adhesive Layer>

About a 50 mg sample was taken from the pressure-sensitive adhesive layer of the pressure-sensitive adhesive layer-bearing polarizing film prepared in each of the examples and the comparative examples. Using a moisture sorption analyzer (IGAsorp manufactured by Hiden Isochema Ltd.), the weight (W1) of the sample was measured immediately after water was completely removed from the sample under the conditions of 100° C. for 1 hour. The sample was then stored at 23° C. and 0% R.H. for 2 hours, at 23° C. and 55% R.H. for 5 hours, at 60° C. and 90% R.H. for 5 hours, and at 23° C. and 55% R.H. for 5 hours while changes in its weight were monitored. The weight (W2) of the sample was determined at the time when the weight of the sample no longer changed (in the saturated state). The saturated water content was determined from the following formula:

$$\text{Saturated water content(wt \%)} = \frac{W2 - W1}{W1} \times 100 \qquad \text{[Formula 1]}$$

<ITO Glass Degradation Test>

(Preparation of Test Materials having Crystalline ITO Layer and Amorphous ITO)

ITO films were formed on one surface of a non-alkali glass sheet by sputtering to form a test material having a crystalline ITO thin film and a test material having an amorphous ITO film. Each test material was heat-treated at 140° C. for 30 minutes before bonded to the pressure-sensitive adhesive layer-bearing polarizing film. The Sn content of the crystalline ITO thin film was 10% by weight. The Sn content of the amorphous ITO thin film was 3% by weight. The Sn content of the ITO thin film was calculated as described above.

(Determination of Rate of Change of Resistance Value)

The test material having an ITO thin film was cut into a piece of 25 mm×25 mm. A 15 mm×15 mm cut piece of the pressure-sensitive adhesive layer-bearing polarizing film obtained in each of the examples and the comparative examples was placed on the central part of the ITO thin film of the test material piece. The pressure-sensitive adhesive layer and the ITO thin film were brought into contact and bonded together and then autoclaved at 50° C. and 5 atm for 15 minutes to form a sample for the measurement of corrosion resistance. The resulting sample was subjected to measurement using the measurement system below, in which "the initial resistance value" was measured. Subsequently, the measurement sample was stored in an environment at 60° C. and 90% R.H. for 500 hours and then subjected to the measurement, in which "the resistance value after heating and humidification" was measured. The resistance values were measured using HL5500PC manufactured by Accent Optical Technologies Inc. The rate of change of the resistance value was calculated from the formula below using the measured initial resistance value and the measured resistance value after heating and humidification, and evaluated according to the criteria below.

1: The rate of resistance change is 120% or less.
2: The rate of resistance change is more than 120% to 150%.
3: The rate of resistance change is more than 150% to 200%.
4: The rate of resistance change is more than 200% to 300%.
5: The rate of resistance change is more than 300% less than 400%.
6: The rate of resistance change is 400% or more.

$$\text{Rate}(\%) \text{ of change of resistance value} = \frac{\text{the resistance value after heating and humidification}}{\text{the initial resistance value}} \times 100 \quad \text{[Formula 2]}$$

The ITO type used in the measurement is shown in Table 2.

<Durability Test>

The separator film was peeled off from the sample of the pressure-sensitive adhesive layer-bearing polarizing film obtained in each of the examples and the comparative examples. The sample was then bonded to the surface of an amorphous ITO formed on a glass sheet. The resulting laminate was autoclaved at 50° C. and 5 atm for 15 minutes and then stored in a heating oven at 80° C. and in a thermo-hygrostat at 60° C. and 90% R.H. After 500 hours, whether peeling and foaming occurred with respect to the polarizing film was visually observed and evaluated according to the criteria below.

◯: No peeling or foaming was detected at all.
Δ: Tiny peeling or foaming occurred at a level invisible to the naked eye.
X: Significant peeling or foaming was observed.

In Table 2, "iodine content" refers to the content (% by weight) of iodine and/or iodide ions in the polarizer.

What is claimed is:
1. A laminate, comprising:
a pressure-sensitive adhesive layer-bearing polarizing film; and
a transparent conductive member comprising a transparent conductive coating, wherein the transparent conductive coating of the member is in contact with and bonded to the pressure-sensitive adhesive layer of the pressure-sensitive adhesive layer-bearing polarizing film;
wherein the pressure-sensitive adhesive layer-bearing polarizing film, comprises:
an iodine-based polarizing film; and
the pressure-sensitive adhesive layer placed on one side of the iodine-based polarizing film;
wherein the iodine-based polarizing film is a one-side protection polarizing film which comprises
an iodine-based polarizer
containing 1% to 14% by weight of iodine and/or iodide ions and
having a thickness of 2 to 40 μm, and
a transparent protective film
provided on only one side of the polarizer, and
having a water-vapor permeability of 300 g/(m²·24 hours) or less at 60° C. and 90% R.H. and comprises an acryl-based polymer, or a polyolefin having a cyclic structure or a norbornene structure; and
the pressure-sensitive adhesive layer is in contact with and bonded to a side of the iodine-based polarizer on which the transparent protective film is not present, and has a saturated water content of 1.3% by weight or less at 60° C. and 90% R.H., and an (meth)acryl polymer obtained by solution polymerization,
the iodine-based polarizer and the transparent protective film are bonded with an adhesive, and

TABLE 2

| | Polarizing plate | | | | | | Pressure-sensitive adhesive layer | | | |
|---|---|---|---|---|---|---|---|---|---|---|
| | Transparent protective film | | | Polarizer | | | Iodine | | | Rate of |
| | Type | Thickness (μm) | Water-vapor permeability (g/(m²·24 h)) | Iodine content (wt %) | Thickness (μm) | Transmittance (%) | content × thickness (wt %·μm) | Water content (wt %) | ITO Type | resistance change | Durability |
| Example 1 | Acrylic | 40 | 250 | 2.3 | 25 | 43 | 58 | 1.3 | Amorphous ITO | 4 | ◯ |
| Example 2 | Acrylic | 40 | 250 | 2.3 | 25 | 43 | 58 | 0.7 | Amorphous ITO | 3 | ◯ |
| Example 3 | Acrylic | 40 | 250 | 2.3 | 25 | 43 | 58 | 0.3 | Amorphous ITO | 2 | ◯ |
| Example 4 | Acrylic | 40 | 250 | 3.1 | 25 | 40 | 78 | 1.3 | Amorphous ITO | 4 | ◯ |
| Example 5 | Acrylic | 40 | 250 | 8 | 5 | 43 | 40 | 1.3 | Amorphous ITO | 3 | ◯ |
| Example 6 | Acrylic | 40 | 250 | 11 | 5 | 40 | 55 | 1.3 | Amorphous ITO | 4 | ◯ |
| Example 7 | Acrylic | 40 | 250 | 5 | 5 | 45 | 25 | 1.3 | Amorphous ITO | 2 | ◯ |
| Example 8 | Acrylic | 40 | 250 | 8 | 5 | 43 | 40 | 1.3 | Amorphous ITO | 3 | Δ |
| Example 9 | Acrylic | 40 | 250 | 8 | 5 | 43 | 40 | 0.7 | Amorphous ITO | 2 | ◯ |
| Example 10 | Acrylic | 40 | 250 | 8 | 5 | 43 | 40 | 0.3 | Amorphous ITO | 1 | ◯ |
| Example 11 | Acrylic | 40 | 250 | 11 | 5 | 40 | 55 | 0.7 | Amorphous ITO | 3 | ◯ |
| Example 12 | COP | 40 | 10 | 8 | 5 | 43 | 40 | 1.3 | Amorphous ITO | 1 | ◯ |
| Example 13 | TAC-HC | 40 | 700 | 8 | 5 | 43 | 40 | 1.3 | Amorphous ITO | 5 | ◯ |
| | | | | | | | | | Crystalline ITO | 1 | ◯ |
| Example 14 | Acrylic | 20 | 470 | 8 | 5 | 43 | 40 | 1.3 | Amorphous ITO | 4 | ◯ |
| Example 15 | Acrylic | 40 | 250 | 8 | 5 | 43 | 40 | 3.1 | Amorphous ITO | 5 | ◯ |
| Comparative Example 1 | TAC | 40 | 1200 | 11 | 5 | 40 | 55 | 1.3 | Amorphous ITO | 6 | ◯ |
| Comparative Example 2 | Acrylic | 40 | 250 | 11 | 5 | 40 | 55 | 5.0 | Amorphous ITO | 6 | ◯ |
| Comparative Example 3 | Acrylic | 40 | 250 | 15 | 5 | 38 | 75 | 1.3 | Amorphous ITO | 6 | ◯ | wherein a rate of resistance change of the transparent conductive coating is less than or equal to 300% when the laminate is stored in an environment of 60° C. and 90% R.H. for 500 hours.

2. The laminate according to claim 1, wherein a value obtained by multiplying the iodine content (wt %) of the iodine-based polarizer by the thickness (μm) of the iodine-based polarizer is from 10 wt %·μm to 80 wt %·μm.

3. An image display device comprising the laminate according to claim 1.

4. The image display device according to claim 3, wherein the transparent conductive member further comprises a liquid crystal cell.

5. The image display device according to claim 3, wherein the transparent conductive member comprising the transparent conductive coating is a transparent conductive film having the transparent conductive coating, and the laminate forms a touch panel.

6. The laminate according to claim 1, wherein the pressure-sensitive adhesive composition comprises a hydroxyl group-containing acrylic monomer having a side chain of 4 or more carbon atoms.

7. The laminate according to claim 1, wherein the transparent conductive coating is made of indium tin oxide.

8. The laminate according to claim 7, wherein the indium tin oxide is amorphous indium tin oxide.

\* \* \* \* \*